United States Patent
Hsu

(10) Patent No.: US 8,884,955 B1
(45) Date of Patent: Nov. 11, 2014

(54) SURFACE SIMPLIFICATION BASED ON OFFSET TILES

(75) Inventor: Stephen Charles Hsu, San Carlos, CA (US)

(73) Assignee: Google Inc., Mountain View, CA (US)

(*) Notice: Subject to any disclaimer, the term of this patent is extended or adjusted under 35 U.S.C. 154(b) by 301 days.

(21) Appl. No.: 13/464,612

(22) Filed: May 4, 2012

(51) Int. Cl.
*G06T 15/40* (2011.01)

(52) U.S. Cl.
USPC .......................................... 345/421; 345/419

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

| | | |
|---|---|---|
| 6,912,293 B1 | 6/2005 | Korobkin |
| 6,970,593 B2 | 11/2005 | Furukawa |
| 7,193,633 B1 | 3/2007 | Reinhardt et al. |
| 2002/0180748 A1* | 12/2002 | Popescu et al. ............... 345/582 |
| 2005/0128212 A1 | 6/2005 | Edecker et al. |
| 2005/0212794 A1 | 9/2005 | Furukawa et al. |
| 2009/0141020 A1 | 6/2009 | Freund et al. |
| 2009/0244062 A1 | 10/2009 | Steedly et al. |
| 2010/0023252 A1* | 1/2010 | Mays et al. ................... 701/201 |
| 2010/0277476 A1* | 11/2010 | Johansson et al. ............. 345/423 |
| 2011/0096083 A1 | 4/2011 | Schultz |
| 2011/0187716 A1 | 8/2011 | Chen et al. |
| 2012/0092374 A1* | 4/2012 | Sarnoff ......................... 345/634 |

* cited by examiner

*Primary Examiner* — Kee M Tung
*Assistant Examiner* — Michelle Chin
(74) *Attorney, Agent, or Firm* — Dority & Manning, P.A.

(57) ABSTRACT

An exemplary method for simplifying the geometry of a three-dimensional mesh includes dividing a first three-dimensional mesh into a first plurality of tiles along initial boundary lines. The method also includes for at least one tile of the first plurality of tiles, reducing the vertices toward a center of the tile while maintaining vertices along a perimeter of the tile, and assembling the first plurality of tiles to determine a second three-dimensional mesh. The method also includes dividing the second three-dimensional mesh into a second plurality of tiles along boundary lines offset from the initial boundary lines. The method further includes for at least one tile of the second plurality of tiles, reducing the vertices toward a center of the tile while maintaining vertices along a perimeter of the tile, and assembling the second plurality of tiles to determine a simplified three-dimensional mesh.

19 Claims, 10 Drawing Sheets

|     |     |     |     |
|-----|-----|-----|-----|
| 201 | 202 | 203 | 204 |
| 205 | 206 | 207 | 208 |
| 209 | 210 | 211 | 212 |
| 213 | 214 | 215 | 216 |

600

| 601 | 602 | 603 | 604 |
| --- | --- | --- | --- |
| 605 | 606 | 607 | 608 |
| 609 | 610 | 611 | 612 |
| 613 | 614 | 615 | 616 |

| 705 | | 710 | |
|---|---|---|---|
| | | | |
| 715 | | 720 | |
| | | | |

FIG. 7

SURFACE SIMPLIFICATION BASED ON OFFSET TILES

BACKGROUND

1. Field

This disclosure generally relates to displaying a three-dimensional model at different resolutions.

2. Background

A geographic information system (GIS) is a system that can be used for storing, retrieving, manipulating, and displaying a three-dimensional model. The three-dimensional model may include satellite images texture mapped to terrain, such as mountains, valleys, and canyons. The GIS uses a virtual camera to navigate through a three-dimensional environment. The virtual camera defines what portion of a three-dimensional model to display to a user in a display area.

A client device may display the three-dimensional model in a geographic information environment. The three-dimensional model may have any number of level-of-detail (LOD) representations that may be displayed in the geographic information environment. Accounting for an LOD of a three-dimensional model may increase or decrease the complexity of the three-dimensional model as the virtual camera moves closer to or farther from the model. The geometry of a three-dimensional model may be simplified to include fewer vertices than the original three-dimensional model.

Traditional approaches to simplifying a three-dimensional model may be insufficient in reducing the number of vertices.

BRIEF SUMMARY

This disclosure generally relates to simplifying the geometry of a three-dimensional mesh.

An exemplary method for simplifying the geometry of a three-dimensional mesh includes dividing a first three-dimensional mesh into a first plurality of tiles along initial boundary lines. Each tile includes a region of the first three-dimensional mesh. The method also includes for at least one tile of the first plurality of tiles, reducing the vertices toward a center of the tile to simplify the mesh included in the tile while maintaining vertices along a perimeter of the tile, and then assembling the first plurality of tiles to determine a second three-dimensional mesh. The method further includes dividing the second three-dimensional mesh into a second plurality of tiles along boundary lines offset from the initial boundary lines. Each tile includes a region of the first three-dimensional mesh. The method also includes for at least one tile of the second plurality of tiles, reducing the vertices toward a center of the tile to simplify the mesh included in the tile while maintaining vertices along a perimeter of the tile, and then assembling the second plurality of tiles to determine a simplified three-dimensional mesh.

Other embodiments of these aspects include corresponding systems, apparatuses, and computer program products configured to perform the actions of these methods, encoded on computer storage devices.

Further features and advantages of embodiments described herein, as well as the structure and operation of various embodiments, are described in detail below with reference to the accompanying drawings. It is noted that the embodiments described below are not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS/FIGURES

Embodiments are described with reference to the accompanying drawings. The accompanying drawings, which are incorporated herein and form a part of the specification, illustrate embodiments and, together with the description, further serve to explain the principles of the embodiments and to enable a person skilled in the relevant art to make and use the embodiments. In the drawings, like reference numbers may indicate identical or functionally similar elements. The drawing in which an element first appears is generally indicated by the left-most digit in the corresponding reference number.

FIG. 6 is a diagram illustrating a simplified three-dimensional mesh, according to an embodiment.

FIG. 7 is a diagram illustrating a simplified three-dimensional mesh at a lower resolution, according to an embodiment.

DETAILED DESCRIPTION

Figure 1:
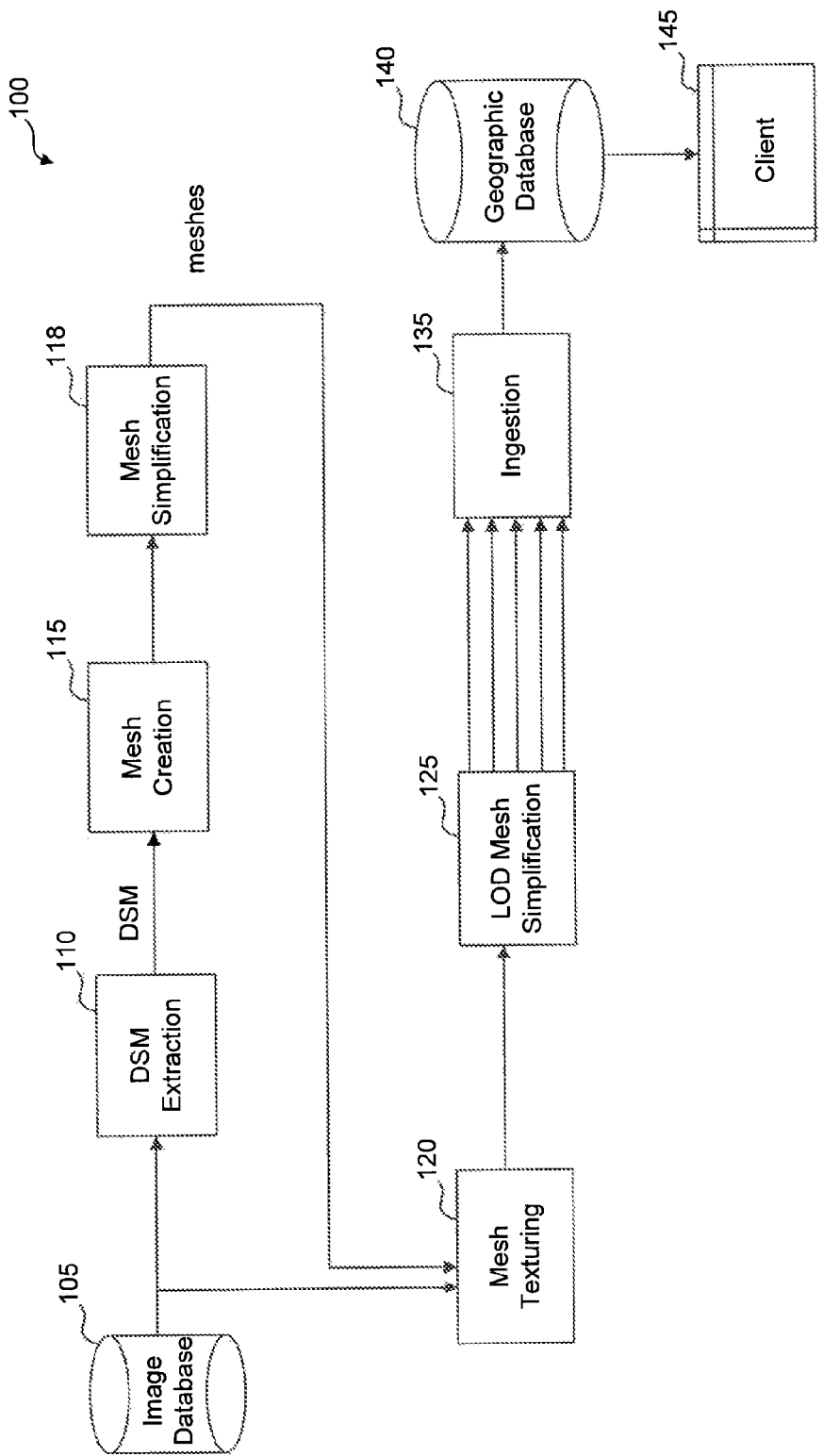
FIG. 1 is a diagram illustrating a process flow diagram for generating a three-dimensional model at different levels of detail, according to an embodiment.

I. Overview
II. Generating a Three-Dimensional Model
   A. Data Extraction
   B. Mesh Creation and Simplification
   C. LOD Mesh Simplification
   D. Render Appropriate Version of the Three-Dimensional Model
III. Example Mesh Simplification System
   A. First Simplification Pass
   B. Second Simplification Pass
   C. Example Operations
IV. Example Method
V. Example Computer Embodiment

I. Overview

This description generally relates to simplifying a three-dimensional model.

A three-dimensional model may be partitioned into sections that precisely fit together such that when the three-dimensional model is rendered it appears seamless. Applying mesh simplification to the model may be useful. For example, one application of simplification generates different levels of detail (LODs) of the model. As such, the simplified model may be less expensive to transmit, store, and render.

Methods and techniques for generating a simplified three-dimensional mesh are provided. The partitioned sections of the mesh may be separated by boundary lines and then simplified independently in parallel. Simplifying the three-dimensional mesh may include collapsing vertices and joining edges that connected to the removed vertices to other vertices. To ensure that the partitions continue to fit together, vertices along the boundaries between the partitions may be kept fixed.

The three-dimensional mesh may be partitioned into tiles. For example, in an embodiment, a first three-dimensional mesh is divided into a first plurality of tiles along initial boundary lines. Each tile includes a region of the first three-dimensional mesh. For at least one tile of the first plurality of tiles, the vertices are reduced toward a center of the tile to simplify the mesh included in the tile while maintaining vertices along a perimeter of the tile, and then the first plurality of tiles is assembled to determine a second three-dimensional mesh.

The second three-dimensional mesh is divided into a second plurality of tiles along boundary lines offset from the initial boundary lines. Each tile includes a region of the first three-dimensional mesh. For at least one tile of the second plurality of tiles, the vertices are reduced toward a center of the tile to simplify the mesh included in the tile while maintaining vertices along a perimeter of the tile, and then the second plurality of tiles is assembled to determine a simplified three-dimensional mesh.

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

II. Generating a Three-Dimensional Model

FIG. 1 is a diagram illustrating a process flow diagram 100 for generating a three-dimensional model at different LODs, according to an embodiment.

A. Data Extraction

Diagram 100 includes a digital surface model (DSM) extraction stage 110 that extracts data from images in image database 105. The images may be taken of a geographic area and may be taken from multiple positions and angles from a camera source located, for example, in an aircraft. As the aircraft flies over the geographic area, the camera source may take multiple images of a particular point. Two or more images may overlap and the depths between the images may be reconstructed.

DSM extraction stage 110 defines a set of three-dimensional points. In an example, a three-dimensional geometry is a three-dimensional model of the Earth. A grid covers an area of space of the Earth, and for every location (x, y) of the grid a height is determined. An output from DSM extraction 110 may be a height field (e.g., an absolute altitude) for each location of the grid.

In an example, a bundle adjustment is performed based on extracting data from the images in image database 105. The bundle adjustment calibrates cameras and aligns poses. Cameras may capture a scene at different angles and each angle may capture specific objects. A surface of a three-dimensional model may be reconstructed from the direction that the cameras were looking at a scene. For example, a camera at a 45-degree angle may capture objects beneath a bridge, and hollow spaces may be reconstructed separately for each camera. These reconstructed pieces may be referred to as patches or mesh sections.

B. Mesh Creation and Simplification

A mesh creation stage 115 combines the mesh sections into a single three-dimensional mesh. In an example, an output of mesh creation stage 115 is a polygonal mesh. A polygonal mesh represents the geometry of a three-dimensional model and is a three-dimensional graphics representation for a surface that has no texture on it. The polygonal mesh may be a consistent untextured mesh that is purely three-dimensional geometry information.

In an embodiment, a three-dimensional mesh may represent terrain with or without features such as buildings and vegetation.

A three-dimensional mesh typically contains a large amount of information. As such, storing and processing the three-dimensional mesh may not be computationally efficient. To ease in the storing and processing of the mesh, it may be divided into subtiles and stored. The subtiles may fit together such that when they are placed next to each other, no gaps exist between them and the divided three-dimensional mesh looks as though it were one continuous mesh.

Figure 2:
FIG. 2 is a diagram illustrating a three-dimensional mesh divided into subtiles, according to an embodiment.

FIG. 2 is a diagram illustrating a three-dimensional mesh 200 divided into subtiles, according to an embodiment. Three-dimensional mesh 200 includes subtiles 201-216. In an example, three-dimensional mesh 200 is stored as subtiles 201-216. The subtiles may be quadrilaterals such as uniform squares or rectangles.

Subtiles 201-216 may fit together such that when they are placed next to each other, no gaps exist. For example, subtiles 201-216 in three-dimensional mesh 200 may be joined together into one simplified output mesh and may be included in a rendering of a three-dimensional model. In this way, the user sees a seamless three-dimensional model. In an example, three-dimensional mesh is a representation of the Earth, and subtiles 201-216 are divided along longitude and latitude lines of the Earth.

Three-dimensional mesh 200 may be a dense mesh. As such, it may be desirable to simplify the mesh so that the resolution appropriate for the current viewpoint is rendered on the screen. For example, a simplified version of three-dimensional mesh 200 may include fewer triangles and vertices compared to three-dimensional mesh 200. Consequently, it may be less expensive to transmit, store, and render the simplified version of three-dimensional mesh 200.

A mesh simplification stage 118 simplifies a three-dimensional mesh. For example, mesh simplification stage 118 may receive a source three-dimensional mesh as, input (e.g., from mesh creation stage 115). A source three-dimensional mesh may refer to the three-dimensional mesh that is used to generate one or more three-dimensional meshes at different resolutions. Mesh simplification stage 118 may then determine a simplified version of the source three-dimensional mesh. The geometry of the simplified three-dimensional mesh includes fewer vertices than the source three-dimensional mesh. More details on mesh simplification are below.

A texture is applied to a surface of the three-dimensional model to enhance the appearance of the three-dimensional model. A mesh texturing stage 120 may determine texture pixels for the surface of the three-dimensional mesh. Mesh texturing stage 120 draws from images in image database 105. Based on the three-dimensional mesh and the images, mesh texturing stage 120 determines what each location on the surface should look like (e.g., the color of that location).

C. LOD Mesh Simplification

An LOD mesh simplification stage 125 may simplify a three-dimensional mesh of a given LOD model. LOD mesh simplification stage 125 generates one or more versions of a three-dimensional mesh at different resolutions based on a source three-dimensional mesh. Different LODs may correspond to different resolutions.

A series of different resolution models may be generated based on a source model. For example, given a first LOD at full resolution, mesh simplification may be applied to the first LOD to produce a second LOD. The second LOD has a lower resolution than the first LOD. Similarly, the first LOD has a higher resolution than the second LOD. Mesh simplification may then be applied to the second LOD to produce a third LOD. The third LOD has a lower resolution than the first and second LODs. Similarly, each of the first and second LODs has a higher resolution than the third LOD. The produced LOD models may be further simplified.

When the user zooms in, it is desirable to render a finer version of the model. Similarly, when the user zooms out, it is desirable to render a coarser version of the model. A coarser version of the model may be displayed when the final set of data to be rendered to a screen is dense and the current viewpoint of the virtual camera is such that it is appropriate to render the coarser version of the model. Displaying the lower resolution model may be less computationally expensive than displaying the higher resolution model. Accordingly, the lower resolution model may be displayed to a user within a satisfactory time period resulting in a more enjoyable user experience.

D. Render Appropriate Version of the Three-Dimensional Model

An ingestion stage 135 ingests one or more generated versions of the source mesh at different resolutions, and stores this data in a geographic database 140. After the appropriate version of the source mesh is generated, the version is put into a data structure that is servable to a client 145. For example, the data may be streamed to client 145 for display in a geographic information environment. A user may manipulate the three-dimensional model and the appropriate resolution of the textured three-dimensional model may be displayed.

Stages 110-135 may be implemented as software, hardware, firmware, or any combination thereof. Further, operations for the above-described embodiments may be further described with reference to one or more logic flows. It may be appreciated that the representative logic flows do not necessarily have to be executed in the order presented, or in any particular order, unless otherwise indicated.

Further, process flow diagram 100 may include more or fewer than the steps shown. For example, in an embodiment, process flow diagram 100 does not include mesh simplification stage 118.

Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

III. Example Mesh Simplification System

Figure 3:
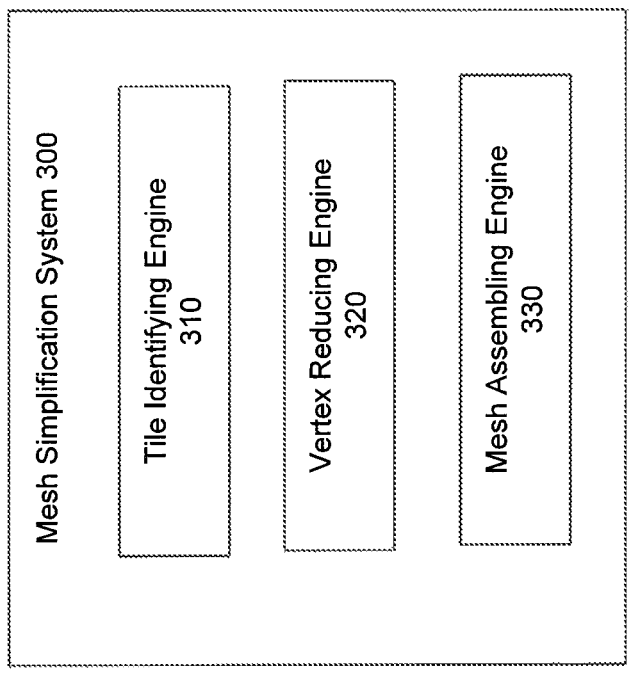
FIG. 3 is a diagram illustrating a mesh simplification system for simplifying a three-dimensional mesh, according to an embodiment.

FIG. 3 is a diagram illustrating a mesh simplification system 300 for simplifying a three-dimensional mesh, according to an embodiment.

System 300 may apply more than one simplification pass to simplify the three-dimensional mesh. Each simplification pass may result in a three-dimensional mesh with fewer vertices than the three-dimensional mesh in the previous pass. System 300 is described in this disclosure as applying a two-pass simplification pass for simplicity. It should be understood, however, that system 300 may apply more than two passes to simplify the three-dimensional mesh. For example, system 300 may apply three, four, five, or more passes to simplify the three-dimensional mesh.

System 300 may obtain a three-dimensional mesh. System 300 includes a tile identifying engine 310, vertex reducing engine 320, and mesh assembling engine 330.

A. First Simplification Pass

In an embodiment, tile identifying engine 310 divides a first three-dimensional mesh into a first plurality of tiles along initial boundary lines. Each tile in the first plurality of tiles includes a region of the three-dimensional mesh.

Figure 4:
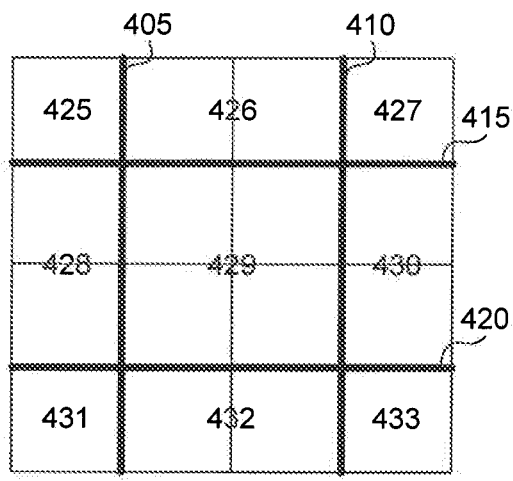
FIG. 4 is a diagram illustrating a first three-dimensional mesh divided into a first plurality of tiles along initial boundary lines, according to an embodiment.

FIG. 4 is a diagram illustrating three-dimensional mesh 200 divided into a first plurality of tiles along initial boundary lines 405, 410, 415, and 420, according to an embodiment. The first plurality of tiles includes tiles 425-433. These tiles are segments of three-dimensional mesh 200 separated by the initial boundary lines. Tiles 425, 427, 431, and 433 are the same size, tiles 426, 428, 430, and 432 are the same size, and these tiles are smaller than tile 429.

The initial boundary lines may be straight lines or crooked lines. In an embodiment, the initial boundary lines are uniformly spaced boundary lines, and the first plurality of tiles are uniform square tiles.

Each tile in the first plurality of tiles includes a region of three-dimensional mesh 200. In particular, tile 425 includes a region covered by subtile 201 of FIG. 2, tile 426 includes a region covered by subtiles 202 and 203 of FIG. 2, tile 427 includes a region covered by subtile 204 of FIG. 2, tile 428 includes a region covered by subtiles 205 and 209 of FIG. 2, tile 429 includes a region covered by subtiles 206, 207, 210, and 211 of FIG. 2, tile 430 includes a region covered by subtiles 208 and 212 of FIG. 2, tile 431 includes a region covered by subtile 213 of FIG. 2, tile 432 includes a region covered by subtiles 214 and 215 of FIG. 2, and tile 433 includes a region covered by subtile 216 of FIG. 2.

The simplified meshes may be independently generated in each subtile. To ensure that the resulting tiles continue to fit precisely together, the boundary vertices of the tiles remain fixed and are not collapsed onto other vertices. Vertices on the boundary of a particular tile are constrained to be fixed so that tiles adjacent to the particular tile continue to fit next to it without gaps or holes.

For example, vertices along initial boundary lines 405, 410, 415, and 420 are not collapsed onto other vertices and remain fixed. The vertices along the boundaries between the four subtiles in tile 429 (e.g., subtiles 206, 207, 210, and 211 of FIG. 2), however, are allowed to collapse. Similarly, the vertices along the boundaries between the two subtiles in tile 428 (e.g., subtiles 205 and 209 of FIG. 2) are also allowed to collapse. As such, when adjacent tiles 428 and 429 are placed next to each other, the subtiles in tile 428 that are adjacent to the subtiles in tile 429 (e.g., subtile 205 is adjacent to subtile 206, and subtile 209 is adjacent to subtile 210) will maintain their consistency and precisely fit together. In this way, the vertices will maintain their consistency and will continue to match up with the vertices of the tile next to it. Otherwise, holes or gaps may be created along the boundaries between the tiles in the three-dimensional mesh.

Vertex reducing engine 320 may merge the geometries of the subtiles by detecting common boundary vertices and removing duplicates while maintaining the vertices along the perimeter of the tiles. Vertex reducing engine 320 may determine which of the vertices can be eliminated. Vertex reducing engine 320 may then remove a vertex and connect the edges that go to the removed vertex to another vertex.

In an embodiment, for at least one tile of the first plurality of tiles, vertex reducing engine 320 reduces the vertices toward a center of the tile to simplify the mesh included in the tile while maintaining vertices along a perimeter of the tile. For example, vertex reducing engine 320 may reduce the vertices toward a center of tile 429 while maintaining vertices along a perimeter of the tile. As such, the vertices along boundary lines 405, 410, 415, and 420 remain fixed and are not simplified. In an embodiment, for each of the first plurality of tiles, vertex reducing engine 320 reduces the vertices toward a center of the tile to simplify the mesh included in the tile while maintaining vertices along a perimeter of the tile.

Vertex reducing engine 320 may use a quadric-based simplification algorithm to simplify the first plurality of tiles. It may be desirable to remove a vertex that is in a place where the three-dimensional mesh is already pretty flat so that removing the vertex mitigates altering the overall shape of the three-dimensional mesh. For example, vertex reducing engine 320 may remove vertices in an order of flattest to most curved in the three-dimensional mesh.

Vertex reducing engine 320 may reduce the vertices of the tiles in parallel. For example, vertex reducing engine 320 may reduce the vertices in each of tiles 425-433 in parallel.

The vertices along the boundaries between the subtiles in a tile are allowed to collapse onto other vertices on the same boundary because that preserves the outline of each source mesh subtile. Accordingly, a simplified version of the first three-dimensional mesh may be partitioned into mesh subtiles corresponding to the source subtiles and then another simplification pass may be performed.

Mesh assembling engine 330 assembles the first plurality of tiles to determine a second three-dimensional mesh. The second-three dimensional mesh has fewer vertices than the first three-dimensional mesh.

In an embodiment, dividing the first three-dimensional mesh into a first plurality of tiles and assembling the first plurality of tiles to determine a second three-dimensional mesh may include physically dividing and physically assembling parts of the first three-dimensional mesh. For example, physically dividing the first three-dimensional mesh and physically assembling the first plurality of tiles may include moving or copying parts of the first three-dimensional mesh into another area of memory.

In another embodiment, dividing the first three-dimensional mesh into a first plurality of tiles and assembling the first plurality of tiles to determine a second three-dimensional mesh may include conceptually dividing and conceptually assembling parts of the first three-dimensional mesh. For example, conceptually dividing the first three-dimensional mesh and conceptually assembling the first plurality of tiles may include taking note of the location of the initial boundary lines as the vertices are reduced toward a center of the particular tile. In this example, the first three-dimensional mesh may be conceptually divided and conceptually assembled without physically moving or copying parts of the first three-dimensional mesh into another area of memory.

B. Second Simplification Pass

In an embodiment, tile identifying engine 310 divides the second three-dimensional mesh into a second plurality of tiles along boundary lines offset from the initial boundary lines. Each tile in the second plurality of tiles includes a region of the first three-dimensional mesh. The second three-dimensional mesh is a simplified version of the first three-dimensional mesh and includes fewer vertices than the first three-dimensional mesh.

Figure 5:
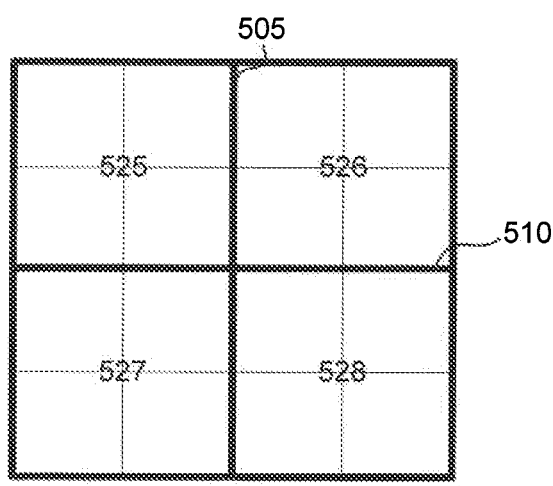
FIG. 5 is a diagram illustrating a second three-dimensional mesh divided into a second plurality of tiles along boundary lines offset from the initial boundary lines, according to an embodiment.

FIG. 5 is a diagram illustrating a second three-dimensional mesh divided into a second plurality of tiles along boundary lines 505 and 510, according to an embodiment. Boundary lines 505 and 510 are offset from initial boundary lines 405, 410, 415, and 420. The initial boundary lines of the first plurality of tiles are diagonally offset by a fraction of a tile from the boundary lines of the second plurality of tiles. The second plurality of tiles includes tiles 525-528. These tiles are segments of the second three-dimensional mesh separated by the boundary lines. Tiles 525-528 are the same size.

Each tile in the second plurality of tiles includes a region of three-dimensional mesh 200. In particular, tile 525 includes a region covered by subtiles 201, 202, 205, and 206 of FIG. 2, tile 526 includes a region covered by subtiles 203, 204, 207, and 208 of FIG. 2, tile 527 includes a region covered by subtiles 209, 210, 213, and 214 of FIG. 2, and tile 528 includes a region covered by subtiles 211, 212, 215, and 216 of FIG. 2.

The simplified meshes may be independently generated in each subtile. To ensure that the resulting tiles continue to precisely fit together, the boundary vertices of the tiles remain fixed and are not collapsed onto other vertices. Vertices on the boundary of a particular tile are constrained to be fixed so that tiles adjacent to the particular tile continue to fit next to it without gaps or holes.

For example, vertices along a perimeter of tiles 525-528 are not collapsed onto other vertices and remain fixed. Each of tiles 525-528 includes four subtiles, and the vertices along the boundaries between the respective four subtiles are, however, allowed to collapse. For example, the vertices along the boundaries between the four subtiles in tile 525 are allowed to collapse. Similarly, the vertices along the boundaries between the four subtiles in tile 526 are also allowed to collapse. As such, when adjacent tiles 525 and 526 are placed next to each other, the subtiles in tile 525 that are adjacent to the subtiles in tile 526 will maintain their consistency and precisely fit together. In this way, the vertices will maintain their consistency and will continue to match up with the vertices of the tile next to it. Otherwise, holes or gaps may be created along the boundaries between the tiles in the three-dimensional mesh.

Vertex reducing engine 320 may merge the geometries of the subtiles by detecting common boundary vertices and removing duplicates while maintaining the vertices along the perimeter of the tiles. Vertex reducing engine 320 may determine which of the vertices can be eliminated. Vertex reducing engine 320 may then remove a vertex and connect the edges that go to the removed vertex to another vertex.

In an embodiment, for at least one tile of the second plurality of tiles, vertex reducing engine 320 reduces the vertices toward a center of the tile to simplify the mesh included in the tile while maintaining vertices along a perimeter of the tile. For example, vertex reducing engine 320 may reduce the vertices toward a center of tile 525 while maintaining vertices along a perimeter of the tile. As such, the vertices along a perimeter of tiles 525-528 remain fixed and are not simplified. In an embodiment, for each of the second plurality of tiles, vertex reducing engine 320 reduces the vertices toward a center of the tile to simplify the mesh included in the tile while maintaining vertices along a perimeter of the tile.

Vertex reducing engine 320 may use a quadric-based simplification algorithm to simplify the second plurality of tiles.

Further, vertex reducing engine 320 may reduce the vertices of the tiles in parallel. For example, vertex reducing engine 320 may reduce the vertices in each of tiles 525-528 in parallel.

Mesh assembling engine 330 assembles the second plurality of tiles to determine a simplified three-dimensional mesh. The simplified three-dimensional mesh has fewer vertices than the second three-dimensional mesh. Reducing the vertices for at least one tile of the first plurality of tiles and for at least one tile of the second plurality of tiles may cause the simplified three-dimensional mesh to be simplified continuously.

In an embodiment, dividing the second three-dimensional mesh into a second plurality of tiles and assembling the second plurality of tiles to determine a simplified three-dimensional mesh may include physically dividing and physically assembling parts of the second three-dimensional mesh. For example, physically dividing the second three-dimensional mesh and physically assembling the second plurality of tiles may include moving or copying parts of the second three-dimensional mesh into another area of memory.

In another embodiment, dividing the second three-dimensional mesh into a second plurality of tiles and assembling the second plurality of tiles to determine a simplified three-dimensional mesh may include conceptually dividing and conceptually assembling parts of the second three-dimensional mesh. For example, conceptually dividing the second three-dimensional mesh and conceptually assembling the second plurality of tiles may include taking note of the location of the boundary lines offset from the initial boundary lines as the vertices are reduced toward a center of the particular tile. In this example, the second three-dimensional mesh may be conceptually divided and conceptually assembled without physically moving or copying parts of the second three-dimensional mesh into another area of memory.

In an embodiment, before vertex reducing engine 320 reduces the vertices in the first plurality of tiles, the boundary lines of the second plurality of tiles are determined and vertex reducing engine 320 is constrained to not form faces straddling the boundary lines offset from the initial boundary lines.

The tiles in the first and second plurality of tiles may be any arbitrary size or shape (e.g., uneven size or non-square shape). For example, the mesh may be divided along straight lines, and the first and second plurality of tiles may be quadrilateral tiles. In an embodiment, if the second plurality of tiles is quadrilateral tiles, the vertex reducing engine 320 is constrained to not form faces straddling the boundary lines offset from the initial boundary lines; otherwise, the first simplification pass may change the mesh such that in the second simplification pass, straight line boundaries different from the initial boundary lines in the first simplification pass may be difficult to find.

In another example, the tiles may be a fixed grouping of subtiles (e.g., 2×2 blocks of subtiles) or a variable grouping of subtiles (e.g., 3×4 blocks of subtiles).

Each of tile identifying engine 310, vertex reducing engine 320, and mesh assembling engine 330 may be implemented as software, hardware, firmware, or any combination thereof, Note that in alternative embodiments, any subset of the components shown in FIG. 3 may in fact be embodied as a single component. For example, the functionality of identifying engine 310 and vertex reducing engine 320 may be combined in a single device or module. Other combinations of the functional components of FIG. 3 are also possible, as would be known to a person of skill in the art.

C. Example Operations

By applying at least two passes to simplify a three-dimensional mesh, vertices along boundary lines may be simplified in a first pass and kept consistent in a second pass. Accordingly, more vertices may be merged resulting in a simplified three-dimensional mesh that is less computationally expensive to store, transmit, and render. For example, regarding the first pass illustrated in FIG. 4, tile 429 includes subtiles 206, 207, 210, and 211. These subtiles are adjacent to each other and vertices along the boundaries between these adjacent subtiles may be merged. In contrast, regarding the second pass illustrated in FIG. 5, vertices along the boundaries between adjacent subtiles 206, 207, 210, and 211 are constrained and are not merged.

The two-pass simplification operation can be used to simplify a three-dimensional mesh at different points in, for example, process flow diagram 100.

For example, in an embodiment, the two-pass simplification operation is performed in relation to the creation of the three-dimensional mesh. For example, the two-pass simplification stage may be performed at mesh simplification stage 118 in FIG. 1.

FIG. 6 is a diagram illustrating a simplified three-dimensional mesh 600 including subtiles 601-616, according to an embodiment. In an example, three-dimensional mesh 200 is created during mesh creation stage 115 and is an input into mesh simplification stage 118. Mesh simplification stage 118 may simplify three-dimensional mesh 200 to determine three-dimensional mesh 600, which includes fewer vertices than three-dimensional mesh 200. Three-dimensional mesh 600 may be an input into mesh texturing stage 120.

In another embodiment, the two-pass simplification operation is performed in relation to the generation of different LODs of the three-dimensional mesh. When generating multiple LODs of a three-dimensional mesh, each mesh is a reduction in the geometry complexity of the source three-dimensional mesh.

FIG. 7 is a diagram illustrating a simplified three-dimensional mesh 700 at a lower resolution, according to an embodiment. Three-dimensional mesh 700 includes subtiles 705, 710, 715, and 720, and each subtile 705, 710, 715, and 720 includes four subtiles that are merged together to form the respective tile. For example, four subtiles are merged together to form subtile 705, four subtiles are merged together to form subtile 710, four subtiles are merged together to form subtile 715, and four subtiles are merged together to form subtile 720. Simplified three-dimensional mesh 700 may then be stored as four subtiles 705, 710, 715, and 720 rather than as 16 subtiles. Subtiles 705, 710, 715, and 720 are of a lower resolution and cover a larger area than their source subtiles. This merging step may be performed before the plurality of tiles is assembled to determine another three-dimensional mesh.

IV Example Method

Figure 8:
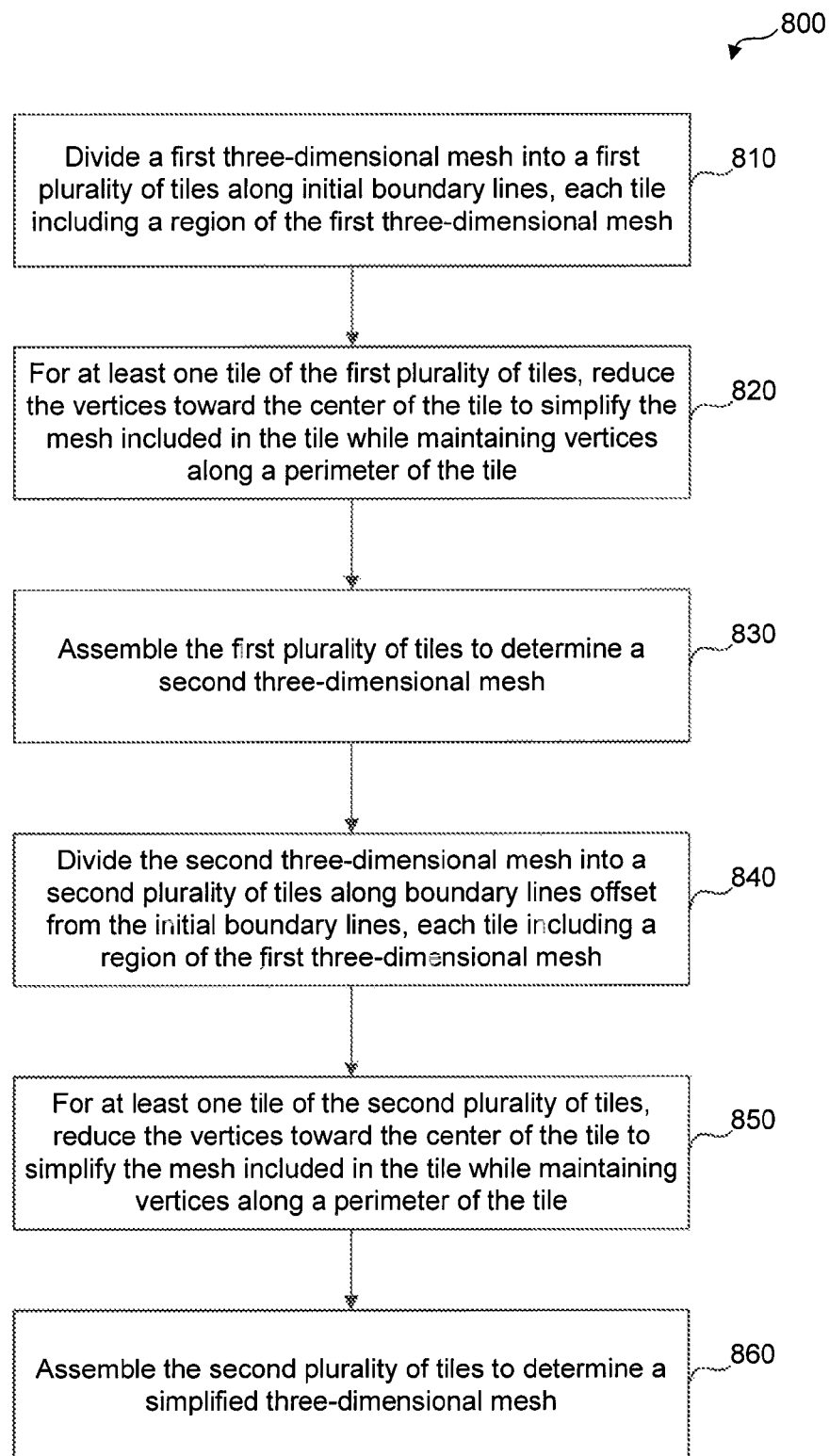
FIG. 8 is an illustration of a flowchart of an example method for simplifying the geometry of a three-dimensional mesh, according to an embodiment.

FIG. 8 is an illustration of a flowchart 800 of an example method for simplifying the geometry of a three-dimensional mesh, according to an embodiment. Method 800 may be used in operation of system 300 in FIG. 3. Although method 800 is described with respect to system 300, it is not meant to be limited to system 300.

At stage 810, a first three-dimensional mesh is divided into a first plurality of tiles along initial boundary lines, each tile including a region of the first three-dimensional mesh. In an example, tile identifying engine 310 divides a first three-dimensional mesh into a first plurality of tiles along initial boundary lines, each tile including a region of the first three-dimensional mesh.

In an example, tile identifying engine 310 physically divides the first three-dimensional mesh into the first plurality of tiles along the initial boundary lines. In another example, tile identifying engine 310 conceptually divides the first three-dimensional mesh into the first plurality of tiles along the initial boundary lines.

The first plurality of tiles may be any arbitrary size or shape. In an embodiment, if the second plurality of tiles is divided along straight lines (e.g., quadrilateral tiles), the vertex reducing engine 320 is constrained to not form faces straddling the boundary lines offset from the initial boundary lines.

Figure 9:
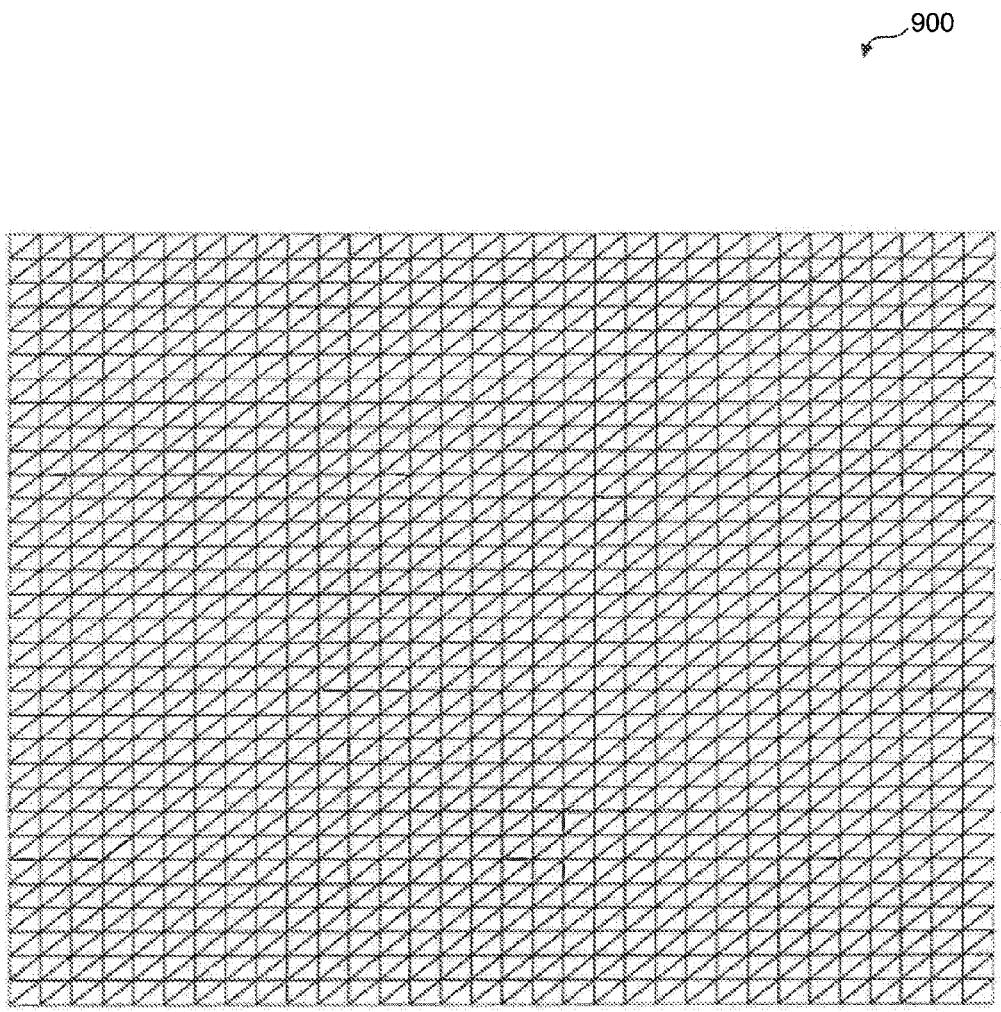
FIG. 9 is a diagram illustrating a first three-dimensional mesh to be simplified, according to an embodiment.

FIG. 9 is a diagram illustrating a first three-dimensional mesh 900 to be simplified, according to an embodiment. In an example, tile identifying engine 310 may divide three-dimensional mesh 900 into a first plurality of tiles along initial boundary lines, each tile including a region of three-dimensional mesh 900.

At stage 820, for at least one tile of the first plurality of tiles, the vertices are reduced toward a center of the tile to simplify the mesh included in the tile while maintaining vertices along a perimeter of the tile. In an example, for at least one tile of the first plurality of tiles, vertex reducing engine 320 reduces the vertices toward a center of the tile to simplify the mesh included in the tile while maintaining vertices along a perimeter of the tile.

At stage 830, the first plurality of tiles is assembled to determine a second three-dimensional mesh. In an example, mesh assembler engine 330 assembles the first plurality of tiles to determine a second three-dimensional mesh.

In an example, mesh assembler engine 330 physically assembles the first plurality of tiles to determine the second three-dimensional mesh. In another example, mesh assembler engine 330 conceptually assembles the first plurality of tiles to determine the second three-dimensional mesh.

Figure 10:
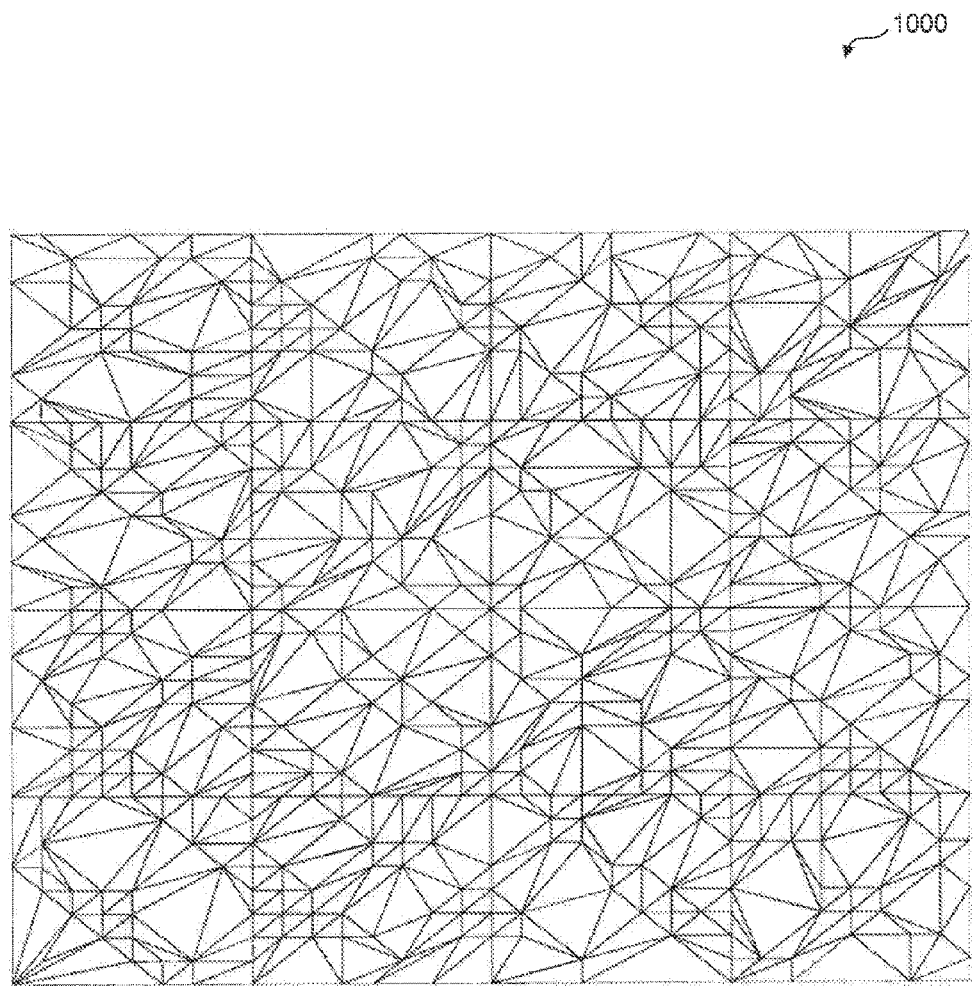
FIG. 10 is a diagram illustrating a second three-dimensional mesh assembled based on simplifying the first three-dimensional mesh, according to an embodiment.

FIG. 10 is a diagram illustrating a second three-dimensional mesh 1000 assembled based on simplifying three-dimensional mesh 900 in FIG. 9, according to an embodiment. In an example, mesh assembler engine 330 assembles the first plurality of tiles to determine three-dimensional mesh 1000.

At stage 840, the second three-dimensional mesh is divided into a second plurality of tiles along boundary lines offset from the initial boundary lines, each tile including a region of the first three-dimensional mesh. In an example, tile identifying engine 310 divides the second three-dimensional mesh into a second plurality of tiles along boundary lines offset from the initial boundary lines, each tile including a region of the first three-dimensional mesh.

In an example, tile identifying engine 310 physically divides the second three-dimensional mesh into the second plurality of tiles along boundary lines offset from the initial boundary lines. In another example, tile identifying engine 310 conceptually divides the second three-dimensional mesh into the second plurality of tiles along boundary lines offset from the initial boundary lines.

At stage 850, for at least one tile of the second plurality of tiles, the vertices are reduced toward a center of the tile to simplify the mesh included in the tile while maintaining vertices along a perimeter of the tile. In an example, for at least one tile of the second plurality of tiles, vertex reducing engine 320 reduces the vertices toward a center of the tile to simplify the mesh included in the tile while maintaining vertices along a perimeter of the tile.

At stage 860, the second plurality of tiles is assembled to determine a simplified three-dimensional mesh. In an example, mesh assembler engine 330 assembles the second plurality of tiles to determine a simplified three-dimensional mesh. Stage 820 and stage 850 may cause the simplified three-dimensional mesh to be simplified continuously.

In an example, mesh assembler engine 330 physically assembles the second plurality of tiles to determine the simplified three-dimensional mesh. In another example, mesh assembler engine 330 conceptually assembles the second plurality of tiles to determine the simplified three-dimensional mesh.

Figure 11:
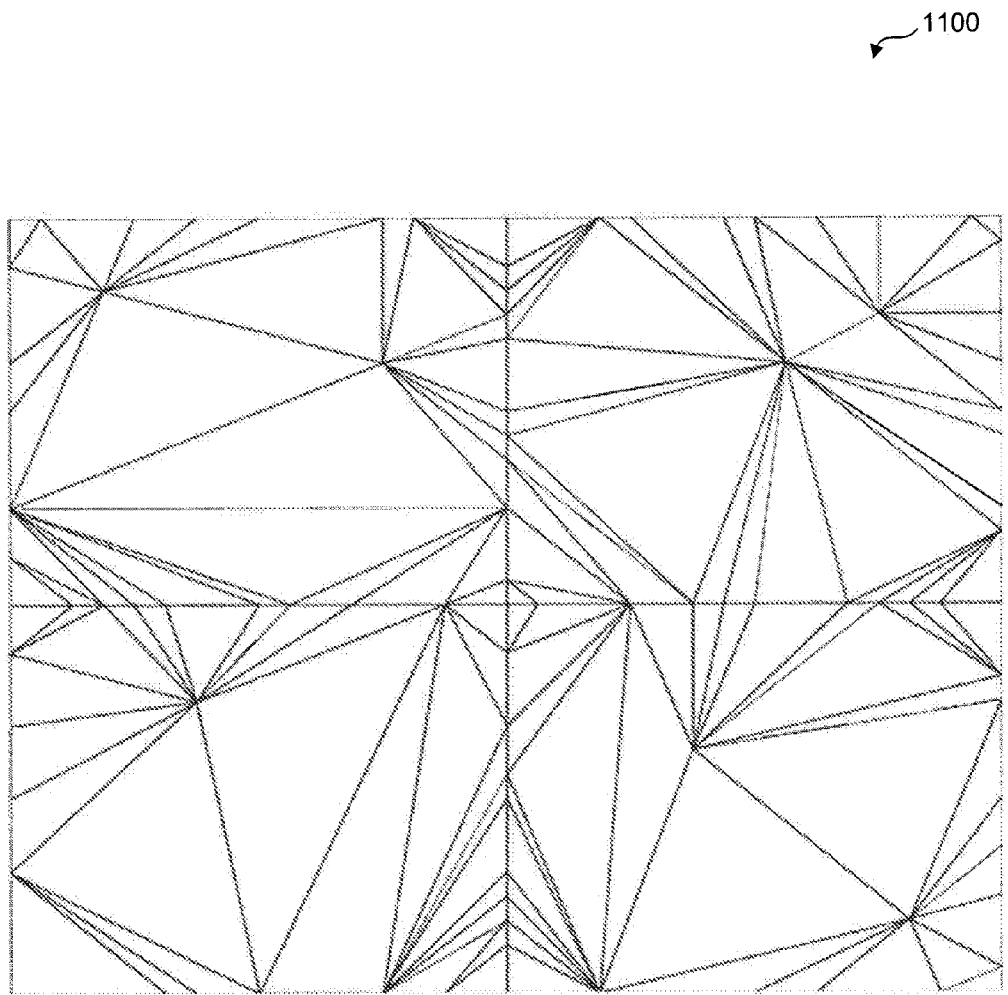
FIG. 11 is a diagram illustrating a simplified three-dimensional mesh assembled based on simplifying the second three-dimensional mesh, according to an embodiment.

FIG. 11 is a diagram illustrating a simplified three-dimensional mesh 1100 assembled based on simplifying three-dimensional mesh 1000 in FIG. 10, according to an embodiment. In an example, mesh assembler engine 330 assembles the second plurality of tiles to determine simplified three-dimensional mesh 1100.

Stages 810-860 may be implemented as software, hardware, firmware, or any combination thereof. Further, operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

V. Example Computer Embodiment

In an embodiment, the system and components of embodiments described herein are implemented using well known computers. For example, process flow diagram 100 and mesh simplification system 300 may be implemented using system 1200.

Figure 12:
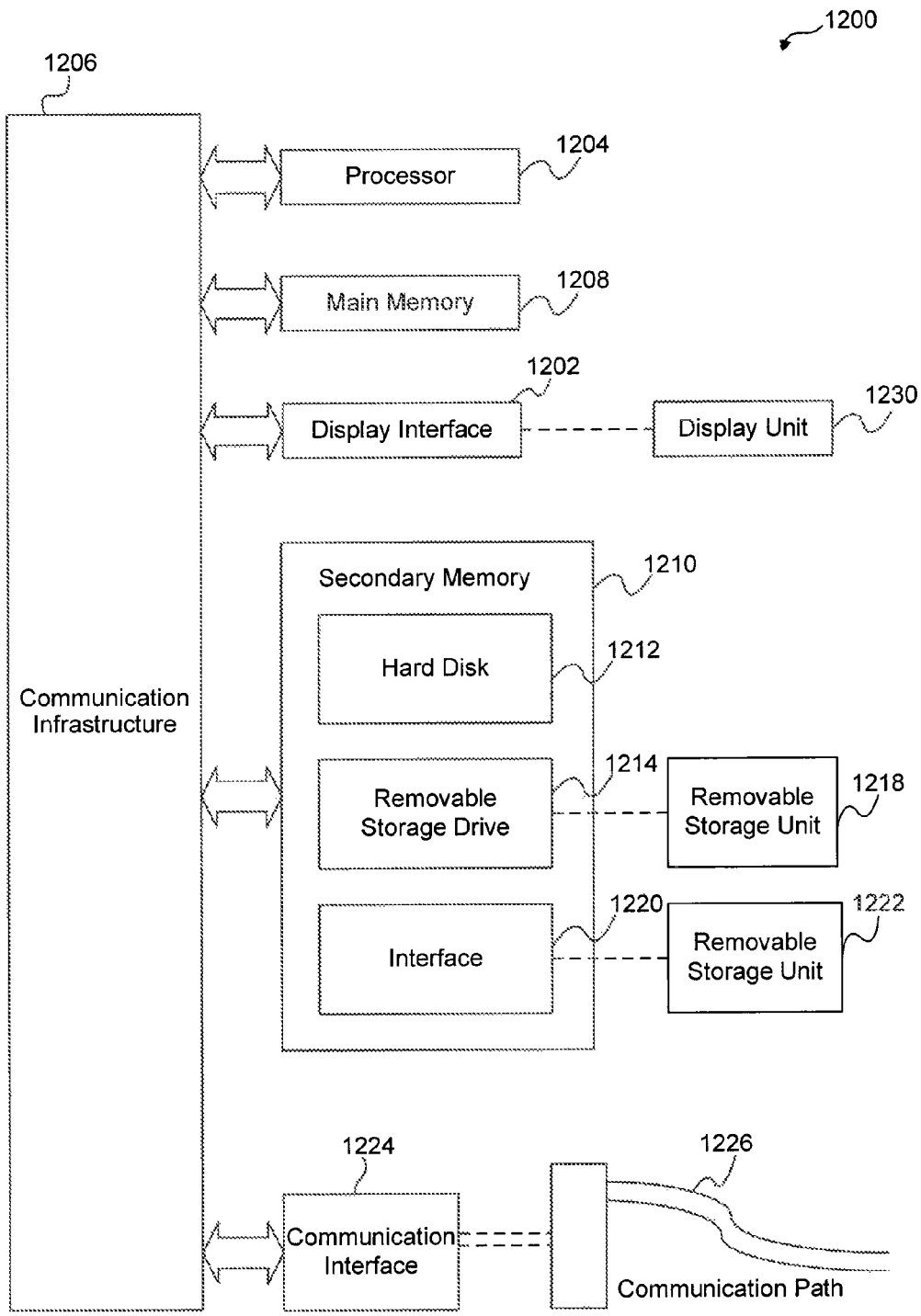
FIG. 12 illustrates an example computer system in which embodiments may be implemented as computer-readable code.

FIG. 12 illustrates an example computer system 1200 in which embodiments may be implemented as computer-readable code. Hardware, software, or any combination of such may embody any of the modules and components in FIGS. 1 and 3. Further, embodiments of tile identifying engine 310, vertex reducing engine 320, and mesh assembling engine 330 can also be implemented as computer-readable code executed on one or more computing devices capable of carrying out the functionality described herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 1200. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1204 may be a special purpose or a general-purpose processor device. As will be appreciated by persons skilled in the relevant art, processor device 1204 may also be a single processor in a multi-core/multiprocessor system, such system operating alone, or in a cluster of computing devices operating in a cluster or server farm. Processor device 1204 is connected to a communication infrastructure 1206, for example, a bus, message queue, network, or multi-core message-passing scheme. Computer system 1200 may also include display interface 1202 and display unit 1230. Display interface 1202 allows results of the computer operations to be displayed to a user or an application developer via display unit 1230.

Computer system 1200 also includes a main memory 1208, for example, random access memory (RAM), and may also include a secondary memory 1210. Secondary memory 1210 may include, for example, a hard disk drive 1212 and removable storage drive 1214. Removable storage drive 1214 may include a floppy disk drive, a magnetic tape drive, an optical disk drive, a flash memory, or the like. The removable storage drive 1214 reads from and/or writes to a removable storage unit 1218 in a well-known manner. Removable storage unit 1218 may include a floppy disk, magnetic tape, optical disk, etc. which is read by and written to by removable storage drive 1214. As will be appreciated by persons skilled in the relevant art, removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 may be in the form of signals, which may be electronic, electromagnetic, optical, or other signals capable of being received by communications interface 1224. These signals may be provided to communications interface 1224 via a communications path 1226. Communications path 1226 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, and a hard disk installed in hard disk drive 1212. Computer program medium and computer usable medium may also refer to memories, such as main memory 1208 and secondary memory 1210, which may be memory semiconductors (e.g. DRAMs, etc.).

Computer programs (also called computer control logic) are stored in main memory 1208 and/or secondary memory 1210. Computer programs may also be received via communications interface 1224. Such computer programs, when executed, enable computer system 1200 to implement embodiments as discussed herein. In particular, the computer programs, when executed, enable processor device 1204 to implement the processes, such as the stages in the method illustrated by flowchart 800 of FIG. 8 discussed above. Accordingly, such computer programs represent controllers of computer system 1200. Where embodiments are implemented using software, the software may be stored in a computer program product and loaded into computer system 1200 using removable storage drive 1214, interface 1220, and hard disk drive 1212, or communications interface 1224.

Embodiments also may be directed to computer program products including software stored on any computer useable medium. Such software, when executed in one or more data processing device, causes a data processing device(s) to operate as described herein. Embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments as contemplated by the inventor(s), and thus, are not intended to limit the embodiments and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method for simplifying the geometry of a three-dimensional mesh, comprising:
   (a) dividing a first three-dimensional mesh into a first plurality of tiles along initial boundary lines, each tile comprising a region of the first three-dimensional mesh;
   (b) for at least one tile of the first plurality of tiles, reducing a number of vertices included within an interior of the entire tile to simplify the mesh included in the tile while maintaining vertices along a perimeter of the tile;
   (c) after the reducing (b), assembling the first plurality of tiles to determine a second three-dimensional mesh;
   (d) dividing the second three-dimensional mesh into a second plurality of tiles along boundary lines offset from the initial boundary lines, each tile comprising a region of the first three-dimensional mesh;
   (e) for at least one tile of the second plurality of tiles, reducing a number of vertices included within an interior of the entire tile while maintaining vertices along a perimeter of the tile; and
   (f) after the reducing (e), assembling the second plurality of tiles to determine a simplified three-dimensional mesh,
   wherein the initial boundary lines of the first plurality of tiles are diagonally offset by a fraction of a tile from the boundary lines of the second plurality tiles.

2. The method of claim 1, whereby the two step reducing of (b) and (e) causes the simplified three-dimensional mesh to be simplified continuously.

3. The method of claim 1, wherein the reducing (b) comprises using a quadric-based simplification algorithm.

4. The method of claim 1, wherein the reducing (e) comprises using a quadric-based simplification algorithm.

5. The method of claim 1, further comprising
   (g) before the reducing (b), determining the boundary lines offset from the initial boundary lines,
   wherein the reducing (b) is constrained to not form faces straddling the boundary lines offset from the initial boundary lines.

6. The method of claim 5, wherein the tiles in the first and second plurality of tiles are rectangular tiles of a same size.

7. The method of claim 1, wherein the tiles are quadrilateral tiles.

8. The method of claim 1, wherein the dividing (a) comprises dividing the first three-dimensional mesh into the first plurality of tiles along straight lines.

9. The method of claim 1, wherein the dividing (a) comprises dividing the first three-dimensional mesh into the first plurality of tiles along crooked lines.

10. The method of claim 1, wherein the reducing (b) comprises reducing the vertices of a first tile and reducing the vertices of a second tile in parallel, the first and second tiles being in the first plurality of tiles.

11. A system for simplifying the geometry of a three-dimensional mesh, comprising:
    a tile grouper configured to:
       (i) divide a first three-dimensional mesh into a first plurality of tiles along initial boundary lines, each tile comprising a region of the first three-dimensional mesh; and
       (ii) divide a second three-dimensional mesh into a second plurality of tiles along boundary lines offset from the initial boundary lines, each tile comprising a region of the first three-dimensional mesh;
    a vertex reducer configured to:
       (i) for at least one tile of the first plurality of tiles, reduce a number of vertices included within an interior of the entire the to simplify the mesh included in the tile while maintaining vertices along a perimeter of the tile; and
       (ii) for at least one the of the second plurality of tiles, reduce a number of vertices included within an interior of the entire tile while maintaining vertices along a perimeter of the tile; and
    an assembler configured to:
       (i) assemble the first plurality of tiles to determine the second three-dimensional mesh; and
       (ii) assemble the second plurality of tiles to determine a simplified three-dimensional mesh,
    wherein the initial boundary lines of the first plurality of tiles are diagonally offset by a fraction of a tile from the boundary lines of the second plurality tiles.

12. The system of claim 11, wherein when the vertex reducer reduces the vertices the vertex reducer is configured to use a quadric-based simplification algorithm.

13. The system of claim 11, wherein before the vertex reducer reduces the tiles in the first plurality of tiles, the vertex reducer is configured to determine the boundary lines offset from the initial boundary lines and the vertex reducer is further configured to not form aces straddling the boundary lines offset from the initial boundary lines.

14. The system of claim 13, wherein the tiles in the first and second plurality of tiles are rectangular tiles of a same size.

15. The system of claim 11, wherein the tiles are quadrilateral tiles.

16. The system of claim 11, wherein the initial boundary lines are straight lines.

17. The system of claim 11, wherein the initial boundary lines are crooked lines.

18. The system of claim 11, wherein the vertex reducer is configured to reduce the vertices of a first tile and reduce the vertices of a second tile in parallel, the first and second tiles being in the first plurality of tiles.

19. An apparatus comprising at least one non-transitory computer readable storage medium encoding instructions thereon that, in response to execution by a computing device, cause the computing device to perform operations comprising:
    (a) dividing a first three-dimensional mesh into a first plurality of tiles along initial boundary lines, each tile comprising a region of the first three-dimensional mesh;
    (b) for at least one tile of the first plurality of tiles, reducing a number of vertices included within an interior of the entire tile to simplify the mesh included in the tile while maintaining vertices along a perimeter of the tile;
    (c) after the reducing (b), assembling the first plurality of tiles to determine a second three-dimensional mesh;
    (d) dividing the second three-dimensional mesh into a second plurality of tiles along boundary lines offset from the initial boundary lines, each tile comprising a region of the first three-dimensional mesh;
    (e) for at least one tile of the second plurality of tiles, reducing a number of vertices included within an interior of the entire tile to simplify the mesh included in the tile while maintaining vertices along a perimeter of the tile; and
    (f) after the reducing (e), assembling the second plurality of tiles to determine a simplified three-dimensional mesh, wherein the initial boundary lines of the first plurality of tiles are diagonally offset by a fraction of a tile from the boundary lines of the second plurality tiles.

* * * * *